(12) United States Patent
Kang et al.

(10) Patent No.: US 10,852,831 B2
(45) Date of Patent: Dec. 1, 2020

(54) USER INTERFACE DEVICE DRIVING CHIP FOR PROVIDING IMPROVED INPUT FEEDBACK AND ELECTRONIC DEVICE USING THE SAME

(71) Applicant: ZINITIX CO., LTD., Gyeonggi-do (KR)

(72) Inventors: Hoai Sig Kang, Gyeonggi-do (KR); Kwang Soo Kim, Gyeonggi-do (KR); Dae Yeul Tcho, Gyeonggi-do (KR); Byeong Checl So, Gyeonggi-do (KR)

(73) Assignee: ZINITIX CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/199,419

(22) Filed: Nov. 26, 2018

(65) Prior Publication Data

US 2020/0167000 A1    May 28, 2020

(51) Int. Cl.
*G06F 3/01* (2006.01)
*G06F 3/041* (2006.01)

(52) U.S. Cl.
CPC ............ *G06F 3/016* (2013.01); *G06F 3/0416* (2013.01)

(58) Field of Classification Search
CPC ................................ G06F 3/016; G06F 3/0416
See application file for complete search history.

(56) References Cited

U.S. PATENT DOCUMENTS

| | | | | |
|---|---|---|---|---|
| 7,742,036 B2* | 6/2010 | Grant | ..................... | H04M 19/04 345/156 |
| 2007/0096594 A1* | 5/2007 | Maruyama | ............ | H01L 41/083 310/317 |
| 2008/0055277 A1* | 3/2008 | Takenaka | ................ | G06F 3/016 345/177 |
| 2010/0085169 A1* | 4/2010 | Poupyrev | ................ | G06F 3/044 340/407.2 |
| 2011/0075835 A1* | 3/2011 | Hill | .................... | H04M 1/72563 379/418 |
| 2011/0157185 A1* | 6/2011 | Song | ........................ | G06F 3/016 345/440 |
| 2011/0285517 A1* | 11/2011 | Lam | ........................ | G06F 3/016 340/407.2 |
| 2012/0206247 A1* | 8/2012 | Bhatia | ..................... | G06F 3/016 340/407.1 |
| 2014/0267065 A1* | 9/2014 | Levesque | ................ | G06F 3/016 345/173 |
| 2015/0086046 A1* | 3/2015 | Oh | ......................... | H04R 17/00 381/151 |

FOREIGN PATENT DOCUMENTS

| KR | 1020140096860 | 8/2014 |
|---|---|---|
| KR | 1020170001186 | 1/2017 |

\* cited by examiner

*Primary Examiner* — Benyam Ketema
(74) *Attorney, Agent, or Firm* — Stuart H. Mayer; Mayer & Williams PC

(57) ABSTRACT

Provided is a vibration motor driving device that controls a vibration motor. The vibration motor driving device includes: a control signal selection unit configured to receive a second control signal provided from a touch detection unit for detecting a touch input to a touch panel and including information for controlling the vibration motor; and a driving current output unit configured to output a vibration motor driving current for driving the vibration motor according to the second control signal.

4 Claims, 13 Drawing Sheets

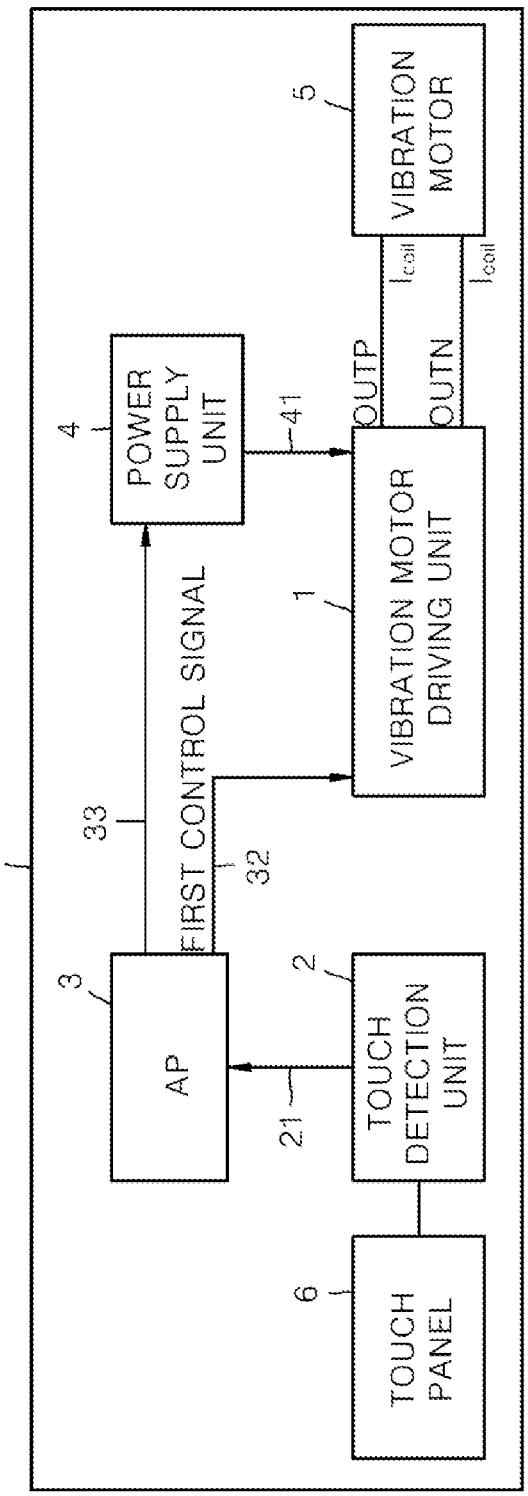
[FIG. 1]

[FIG. 2]
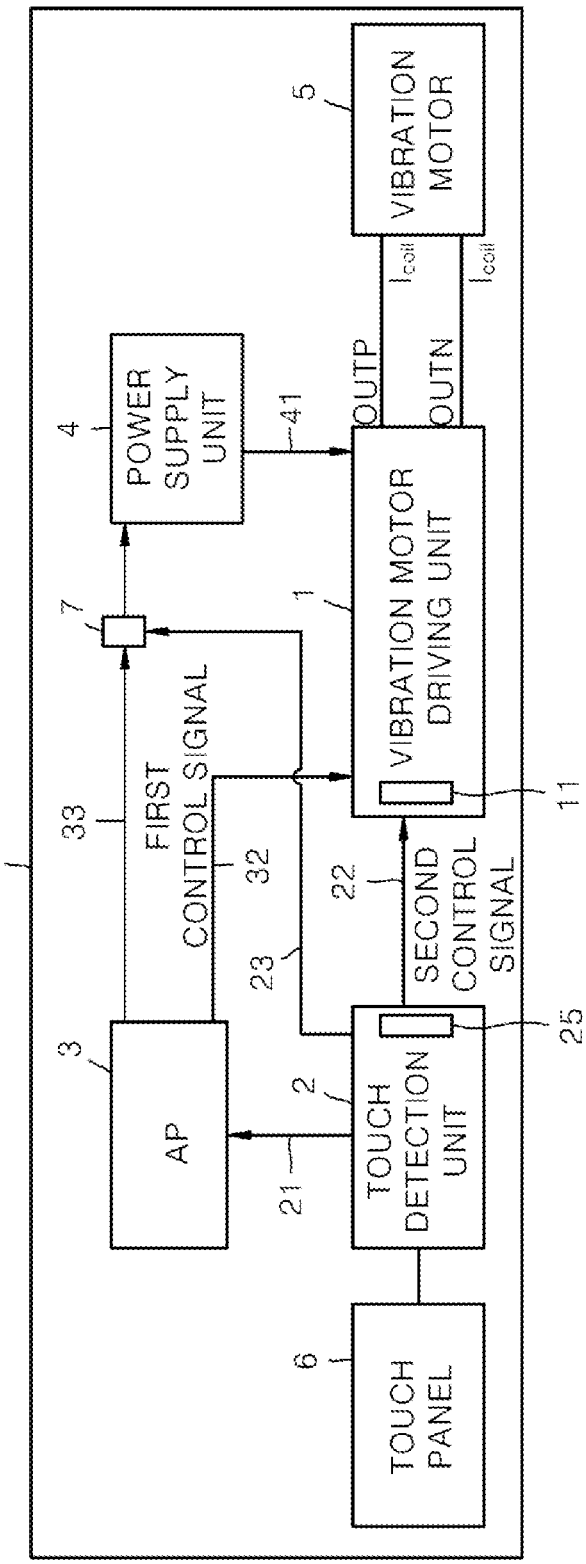

[FIG. 3]
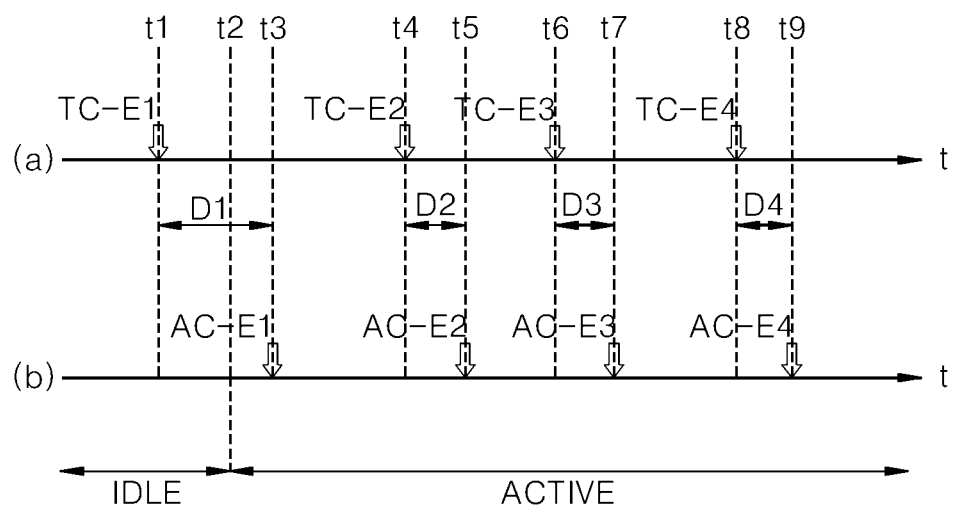

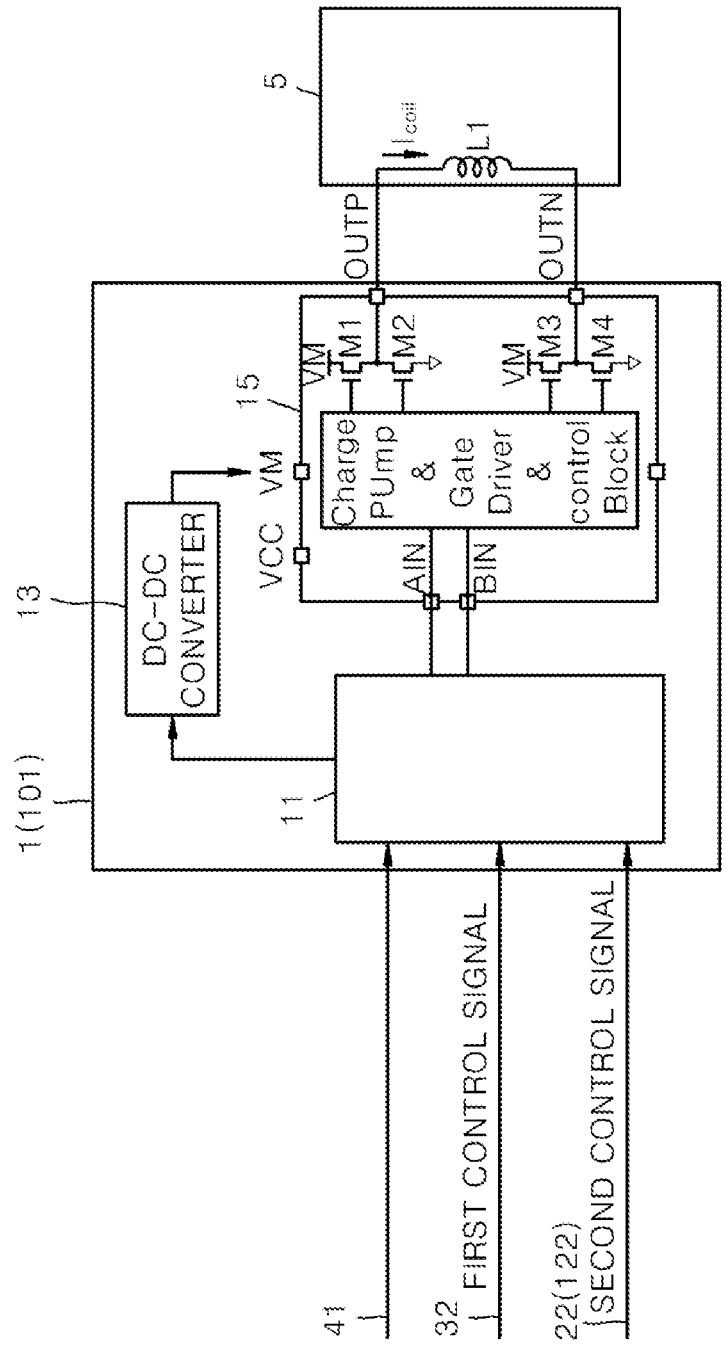

[FIG. 5]
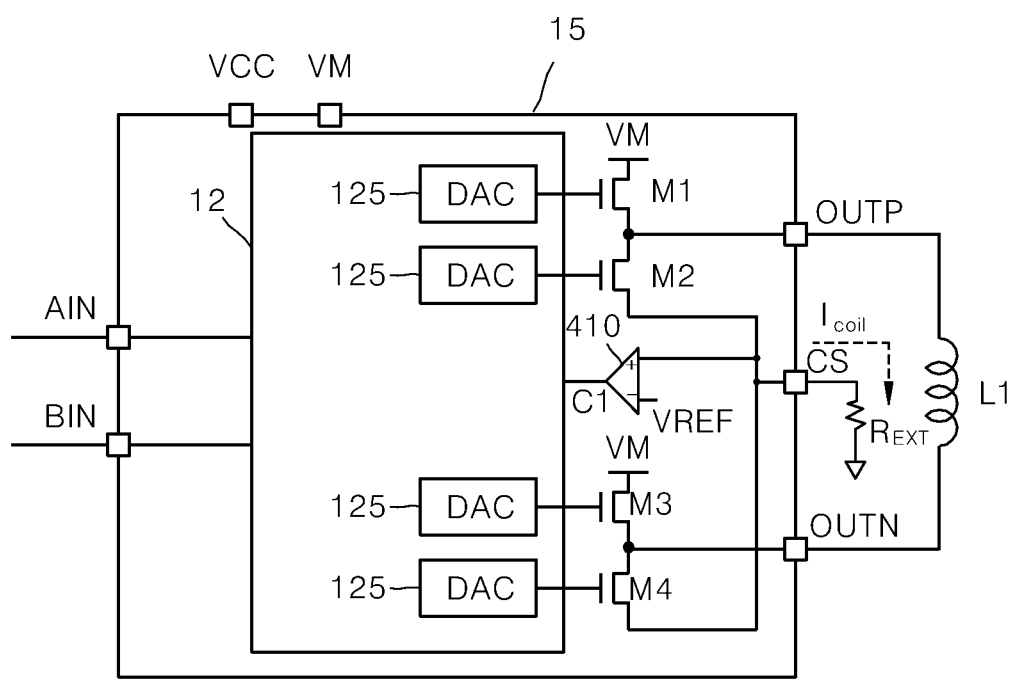

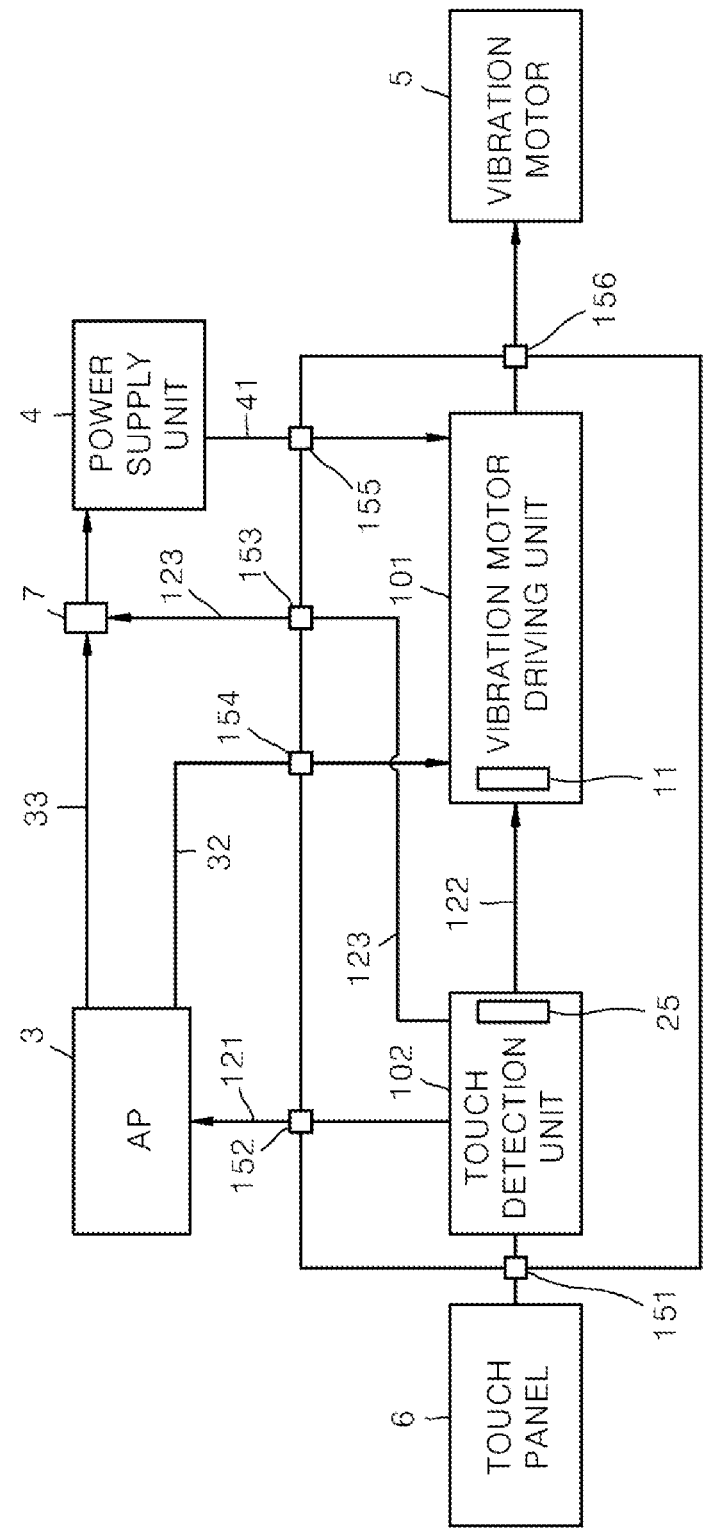

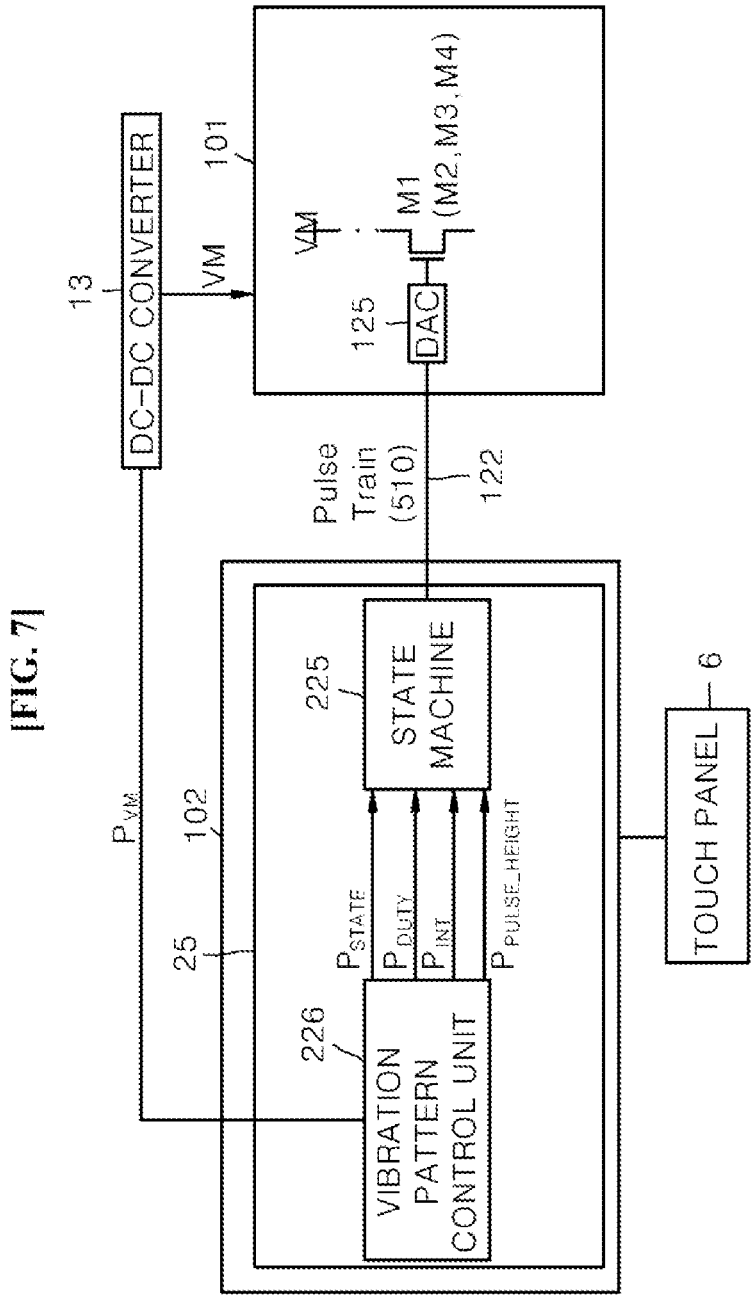
[FIG. 7]

[FIG. 8]
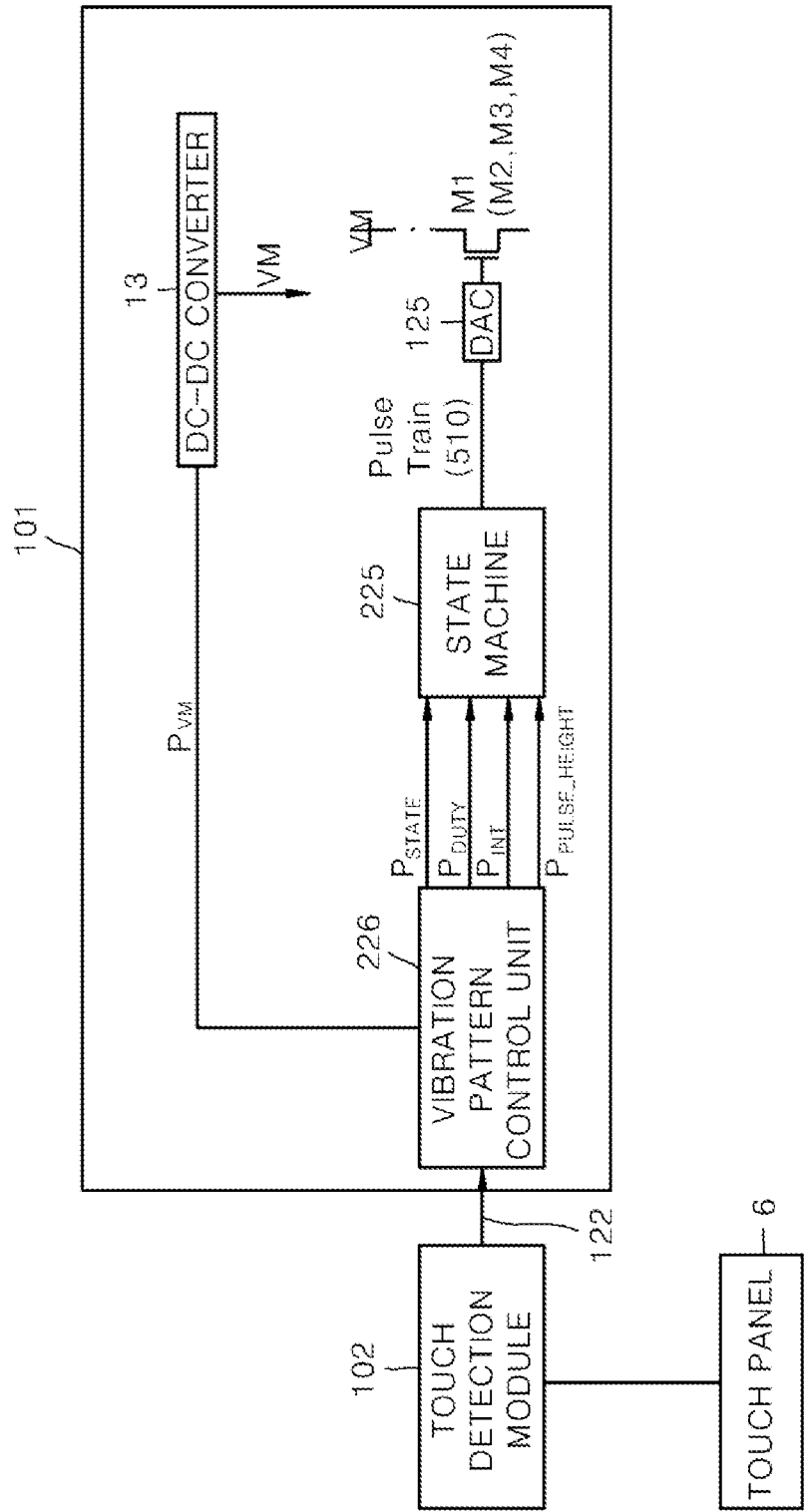

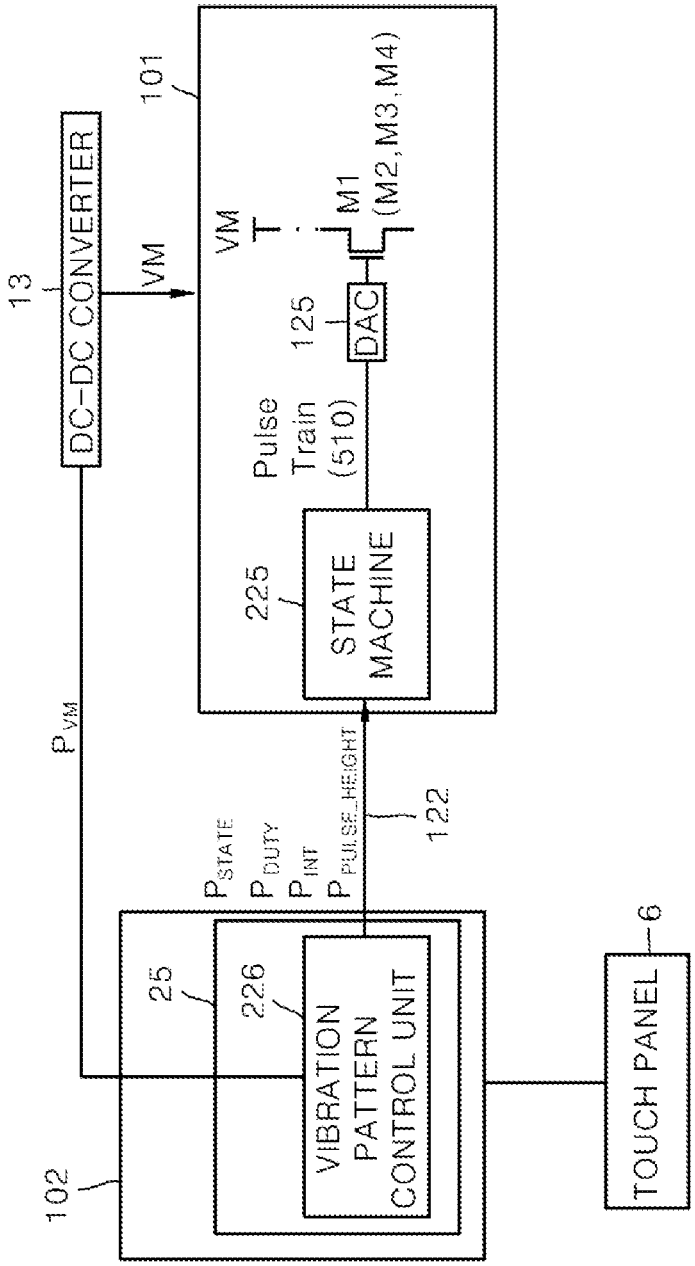

[FIG. 10]
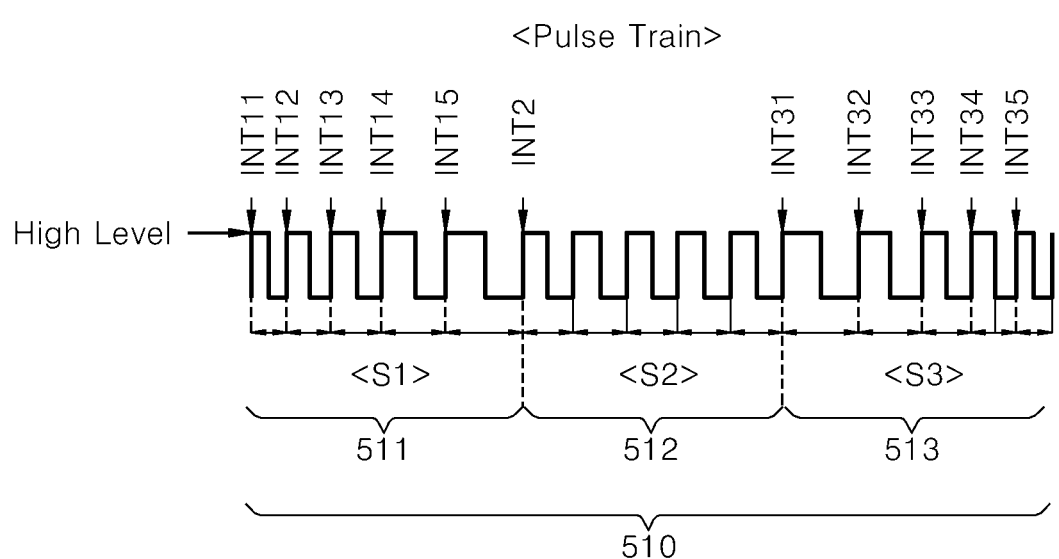

[FIG. 12]
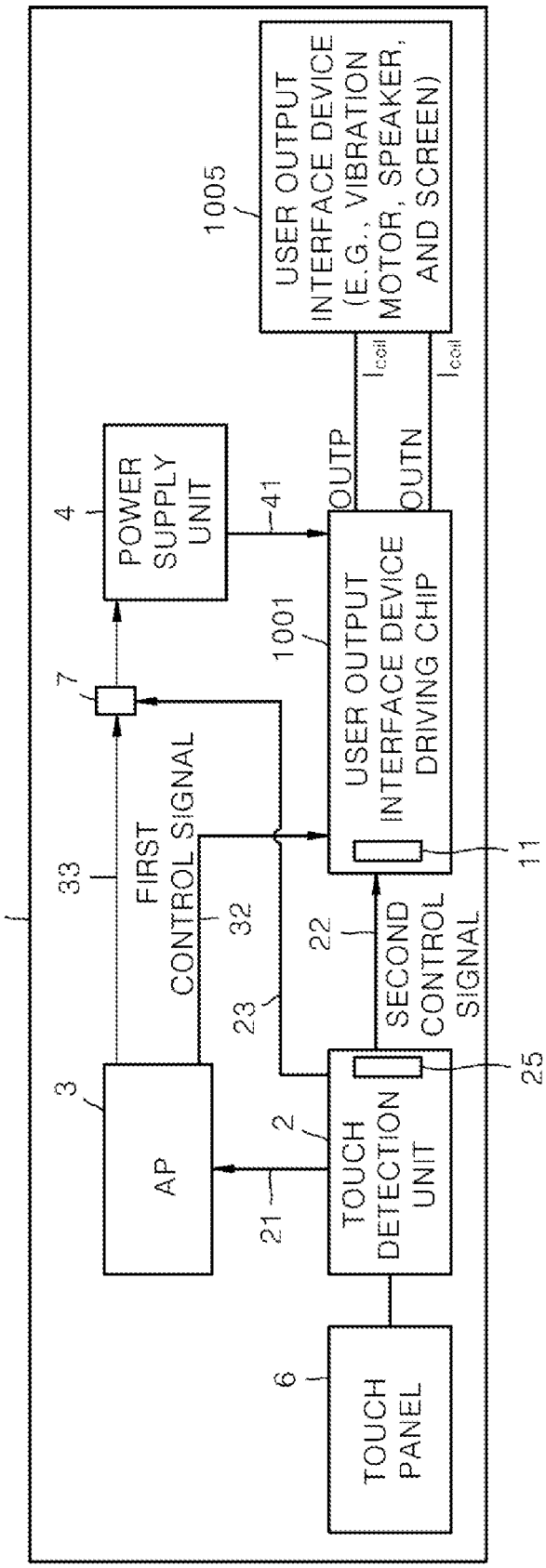

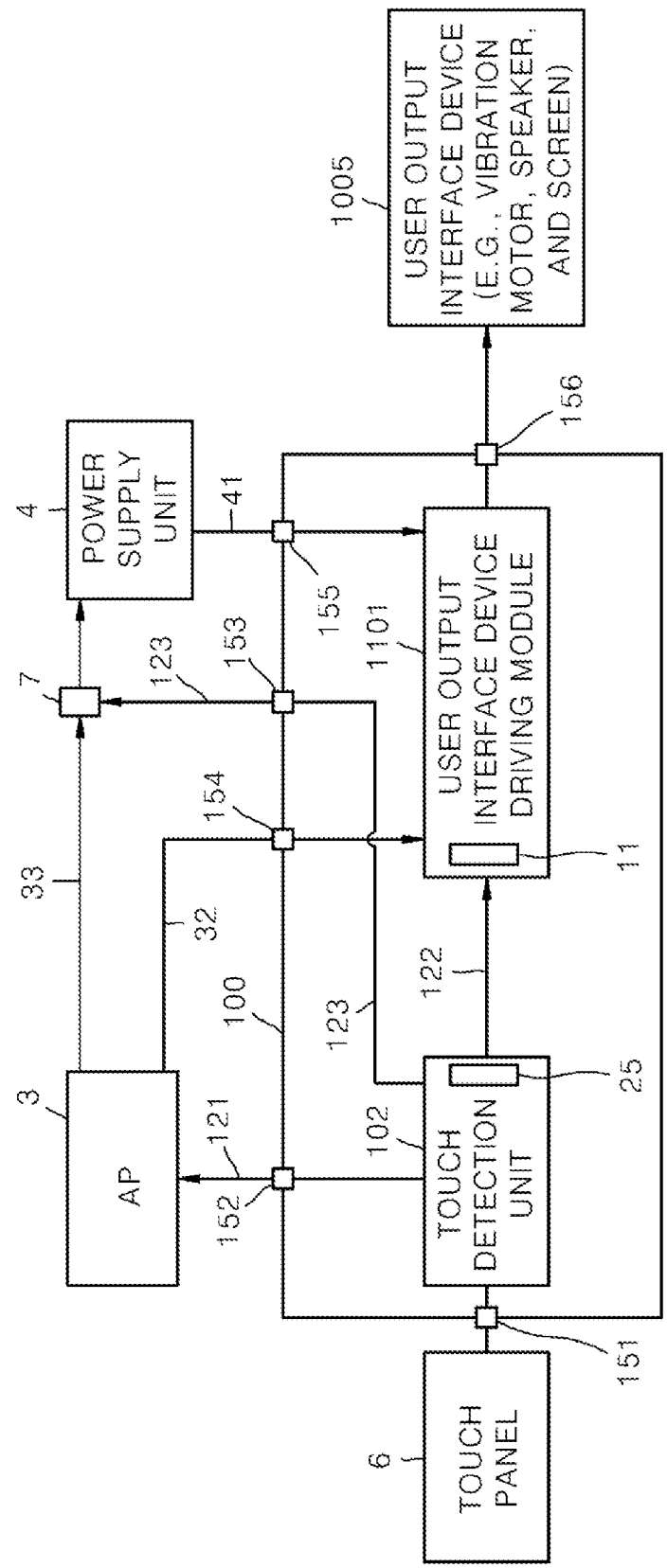

USER INTERFACE DEVICE DRIVING CHIP FOR PROVIDING IMPROVED INPUT FEEDBACK AND ELECTRONIC DEVICE USING THE SAME

BACKGROUND

The present invention relates to a user output interface driver configured to quickly respond to a touch input to a touch panel, which is an input interface of a user electronic device, and a device including the same.

The prior art relating to a touch panel which is an input interface of a user electronic device and a touch control circuit for driving the touch panel to process a touch input to the touch panel is disclosed in, for example, Korean Patent Laid-Open Nos. 2011-0126026, 2016-0006982, and 2016-0081529.

The information on the touch input may be provided to an application processor (hereinafter simply referred to as an AP) included in the electronic device. The AP may generate a control signal to be outputted in response to the touch input or in response to other events by a program installed in the electronic device, and may provide control signals to drivers for various user output interfaces connected to the AP. The various user output interfaces may include, for example, a vibrator (vibration unit) for outputting vibration, a speaker for outputting sound, and a display module for providing an image. Accordingly, the AP may provide the control signal to, for example, a vibration motor driving unit driving the vibration motor included in the vibrator (in other words, a vibration motor driving module, a vibration motor driving IC, and a vibration motor driving chip), or may provide the control signal to a VCM driver for driving a voice coil actuator included in the speaker, or may provide the control signal to a display driver that drives the display module. For example, U.S. Ser. No. 09/158,379B and U.S. Ser. No. 09/508,236B are disclosed as conventional techniques for driving a vibration motor.

In the case where the user output interface is configured to respond to the touch input, it is desirable that the reaction occurs immediately. However, when the AP is in an idle mode (in other words, sleep mode or pause mode), a delay time is required for the AP to wake up. When the touch input is generated, a touch detection unit (in other words, a touch detection module, a touch detection IC, and a touch detection chip) for processing the touch input transmits the related information to the AP, and when the AP is in idle mode, because of the time it takes to wake up the AP, a delay may occur in the output of the user output interface corresponding to the touch input. Further, even if the AP is in an activated state, in the case where the AP generates the control signal corresponding to the touch input by software, a delay may occur in generation of the control signal depending on the execution priority among the software. Also, even if the AP is in the active mode, there is a problem that a user output interface response delay time occurs due to the recognition interval if the AP recognizes the touch input discontinuously in a polling manner.

That is, in some situations, there is a delay time until the AP confirms the touch input and starts driving the user output interface.

SUMMARY

The present invention is to provide a technique for minimizing a delay of a response output to be outputted in response to a touch input.

According to one aspect of the present invention, a vibration motor driving device 1 for controlling the vibration motor 5 may be provided. The vibration motor driving device may include: a control signal selection unit 11 configured to receive a second control signal provided from a touch detection unit 2 for detecting a touch input to a touch panel 6 and including information for controlling the vibration motor 5; and a driving current output unit 15 configured to output a vibration motor driving current Icoil for driving the vibration motor according to the second control signal.

At this time, the control signal selection unit 11 is further configured to receive a first control signal including information for controlling the vibration motor from an AP 3 performing one or more applications using information on a touch input provided from the touch detection unit 2.

At this time, when a delay between the second control signal, which is most recently received before receiving the first control signal, and the first control signal is determined to be equal to or less than a predetermined value and the first control signal and the second control signal are all for instructing the driving of the vibration motor to the touch input, the control signal selection unit 11 is configured to discard the first control signal.

According to an aspect of the present invention, an electronic device including a touch detection unit 2 and a vibration motor driving unit 1 may be provided. At this time, the touch detection unit 2 detects a touch input to a touch panel 6 connected to the touch detection unit 2, generates a second control signal including information for controlling the vibration motor driving unit 10 in correspondence to the detected touch input, and provides the generated second control signal to the vibration motor driving unit 1, and the vibration motor driving unit 1 may be configured to output a vibration motor driving current Icoil for driving the vibration motor according to the second control signal.

At this time, the electronic device may further include a power supply unit 4 for providing power to the vibration motor driving unit 1, and the touch detection unit 2 is configured to provide a second wake-up signal to the power supply unit 4 in response to the touch input, and the power supply unit 4 is configured to switch to an active mode to supply power to the vibration motor driving unit when receiving the second wakeup signal while the power supply unit 1 is in an idle mode.

At this time, the electronic device further includes an AP 3 that performs one or more applications using information on the touch input provided from the touch detection unit 2 and the vibration motor driving unit 1 is further configured to receive a first control signal including information for controlling the vibration motor driving unit 1 from the AP 3 and discard the first control signal when a delay between the second control signal, which is most recently received before receiving the first control signal, and the first control signal is determined to be equal to or less than a predetermined value and the first control signal and the second control signal are all for instructing the driving of the vibration motor to the touch input.

According to an aspect of the present invention, a user interface device driving chip 100 including a touch detection module 102 and a vibration motor driving module 101 may be provided. At this time, the touch detection module 102 detects a touch input to the touch panel 6 connected to the user interface device driving chip 100, and provides the vibration motor driving module 101 with a second control signal including information for controlling the vibration motor driving module 101 corresponding to the detected touch input, and the vibration motor driving module 101 outputs a vibration motor driving current Icoil for driving the vibration motor 5 according to the second control signal to an output terminal 156 (OUTP, OUTN) of the user interface device driving chip 100.

At this time, the power supplied to at least some of the elements constituting the vibration motor driving module 101 is separated from the power provided to the touch detection module and is supplied to the outside of the user interface device driving chip 100 by the power supply unit 4, and the touch detection module 102 is configured to provide a second wakeup signal to the power supply unit 4 in response to the touch input, and the second wake-up signal may be a signal that causes the power supply unit 4 to supply power to the at least some of the devices by switching the power supply unit 4 to an active mode when the power supply unit 4 is in the idle mode.

According to another aspect of the present invention, a user output interface device driving chip 1001 may be provided to control a user output interface device 1005 that stimulates a person's view, auditory, and tactile sense. At this time, the user output interface device driving chip may include a control signal selection unit 11 configured to receive a second control signal provided from a touch detection unit 2 for detecting a touch input to a touch panel 6 and including information for controlling the vibration motor 1005, and drive the user output interface device 1005 according to the second control signal.

According to another aspect of the present invention, an electronic device may be provided with a touch detection unit 2 and a user output interface device driving chip 1001 for controlling a user output interface device 1005 that stimulates a person's view, auditory, and tactile sense. At this time, the touch detection unit 2 detects a touch input to the touch panel 6 connected to the touch detection unit 2 and provides a second control signal including information for controlling the user output interface device driving chip 1001 corresponding to the detected touch input, and the user output interface device 1005 may be driven by the user output interface device driving chip 1001 according to the second control signal.

According to another aspect of the present invention, a user interface device driving chip 100 may be provided with a touch detection module 102 and a user output interface device driving module 1101. At this time, the touch detection module 102 may be configured to provide the vibration motor driving module 1101 with the second control signal including information for controlling the user output interface device driving module 1101 after detecting a touch input to the touch panel 6 connected to the user interface device driving chip 100 in response to the detected touch input, and the user output interface device driving module 1101 may be driven according to the second control signal.

According to another aspect of the present invention, there is provided an electronic device including a touch detection unit, a vibration motor driving unit, and a power supply unit for providing power to the vibration motor driving unit. At this time, the touch detection unit is configured to provide a second wake-up signal to the power supply unit in response to a touch input to a touch panel connected to the touch detection unit, and when the power supply unit is in the idle mode, the power supply unit switches to an active mode to supply power to the vibration motor driving unit when the second wakeup signal is received.

At this time, the touch detection unit is configured to generate a second control signal including information for controlling the vibration motor driving unit in response to the touch input to provide the generated second control signal to the vibration motor driving unit. And, the vibration motor driving unit may output a vibration motor driving current for driving the vibration motor according to the second control signal.

According to another aspect of the present invention, a user interface device driving chip including a touch detection module and a vibration motor driving module may be provided. At this time, the power supplied to at least some of the elements constituting the vibration motor driving module is separated from the power provided to the touch detection module and is supplied to the outside of the user interface device driving chip by the power supply unit, and the touch detection module is configured to provide a second wakeup signal to the power supply unit in response to the touch input to the touch panel connected to the user interface device driving chip, and the second wake-up signal may be a signal that causes the power supply unit to supply power to the at least some of the devices by switching the power supply unit to an active mode when the power supply unit is in the idle mode.

At this time, the touch detection module is configured to provide a second control signal including information for controlling the vibration motor driving module to the vibration motor driving module in response to the touch input. Then, the vibration motor driving module may be configured to output a vibration motor driving current for driving the vibration motor through the output terminal of the user interface device driving chip according to the second control signal.

According to another aspect of the present invention, an electronic device may be provided with a touch detection unit, a user output interface device driving chip for controlling a user output interface device that stimulates a person's view, auditory, and tactile sense, and a power supply unit for providing power to the user output interface device driving chip. At this time, the touch detection unit is configured to provide a second wake-up signal to the power supply unit in response to a touch input to a touch panel connected to the touch detection unit, and when the power supply unit is in the idle mode, the power supply unit switches to an active mode to supply power to the user output interface device driving chip when the second wakeup signal is received.

At this time, the touch detection unit is configured to provide a second control signal including information for controlling the user output interface device driving chip to the user output interface device driving chip in response to the touch input. And the user output interface device may be driven according to the second control signal by the user output interface device driving chip.

According to another aspect of the present invention, a user interface device driving chip including a touch detection module and a user output interface device driving module may be provided. At this time, the power supplied to at least some of the elements constituting the user output interface device driving module is separated from the power provided to the touch detection module and is supplied to the outside of the user interface device driving chip by the power supply unit, and the touch detection module is configured to provide a second wakeup signal to the power supply unit in response to the touch input to the touch panel connected to the user interface device driving chip, and the second wake-up signal may be a signal that causes the power supply unit to supply power to the at least some of the devices by switching the power supply unit to an active mode when the power supply unit is in the idle mode.

At this time, the touch detection unit is configured to provide a second control signal including information for controlling the user output interface device driving module to the user output interface device driving module in response to the detected touch input. And the user output interface device driving module may be driven according to the second control signal.

BRIEF DESCRIPTION OF THE FIGURES

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a block diagram illustrating an electronic device according to a comparative embodiment in which functions necessary for an output to be provided to a user in response to the touch input are selected;

FIG. 2 is a block diagram illustrating an electronic device according to an embodiment of the present invention in which functions necessary for an output to be provided to a user in response to the touch input are selected;

FIG. 3 shows an example of timing of control signals for controlling a vibration motor driving unit provided by an AP and a touch detection module according to an embodiment of the present invention;

FIG. 4 shows a configuration of a vibration motor driving unit according to an embodiment of the present invention;

FIG. 5 shows a part of the configuration of the vibration motor driving unit modified from FIG. 4;

FIG. 6 is for describing a user interface device driving chip provided according to an embodiment of the present invention;

FIG. 7 is a diagram for explaining a technique for generating the above-described pulse train used in the vibration motor driving module, according to an embodiment of the present invention;

FIG. 8 is a diagram for explaining a technique for generating the above-described pulse train used in the vibration motor driving module, according to another embodiment of the present invention;

FIG. 9 is a diagram for explaining a technique for generating the above-described pulse train used in the vibration motor driving module, according to another embodiment of the present invention;

FIG. 10 shows an example of the pulse train described with reference to FIGS. 7 to 9;

FIG. 12 shows a modified embodiment of FIG. 2; and

FIG. 13 shows a modified embodiment of FIG. 6.

DETAILED DESCRIPTION

Figure 11A:
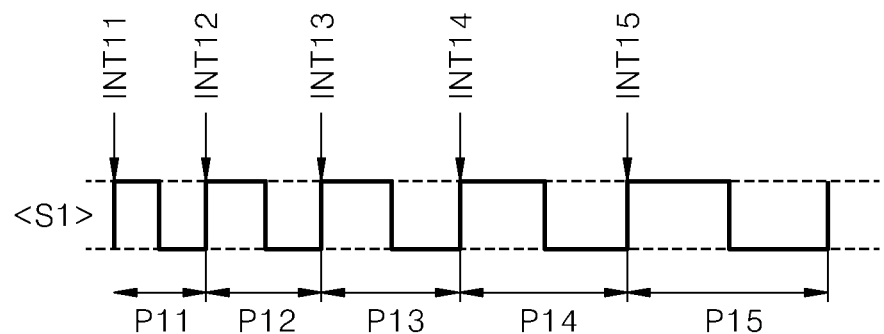
FIG. 11A shows the first type partial pulse train shown in FIG. 10 separately.

Hereinafter, embodiments of the present invention will be described with reference to the accompanying drawings. However, the present invention is not limited to the embodiments described herein, but may be implemented in various other forms. The terminology used herein is for the purpose of understanding the embodiments and is not intended to limit the scope of the present invention. In addition, the singular forms used below include plural forms unless the phrases expressly have the opposite meaning.

<Comparative Embodiment>

FIG. 1 is a block diagram illustrating an electronic device 10' according to a comparative embodiment in which functions necessary for an output to be provided to a user in response to the touch input are selected.

The electronic device 10' may include a vibration motor driving unit 1, a touch detection unit 2, an AP 3, a power supply unit 4, a vibration motor 5, and a touch panel 6. When the vibration motor driving unit 1 is provided in a chip form, the vibration motor driving unit 1 may be referred to as a vibration motor driving device.

The touch detection unit 2 may detect the presence or absence of user input to the touch panel 6 and the occurrence position thereof.

In a state where the AP 3 is in the idle mode, which is the inactive mode, the touch detection unit 2 may provide an interrupt signal to the AP 3 through the interrupt channel 21 when the touch input is confirmed.

In an embodiment, when the AP 3 is in the idle mode, the touch detection unit 2 knows that the AP 3 is in the idle mode, and the touch detection unit 2 may generate the interrupt signal only when the AP 3 is in the idle mode.

If the AP 3 is provided with the interrupt signal in the idle mode, the AP 3 may be switched to the active mode.

A delay may occur from a first time point at which the touch input occurs to a second time point at which the AP 3 is switched to the active mode, which may be referred to as a first delay in this document.

The AP 3 in the active mode state may be provided with the touch input from the touch detection unit 2 and the touch position. When touch input occurs, the AP 3 provides a first control signal for driving the vibration motor 5 to the vibration motor driving unit 1 through the first communication channel 32 formed between the AP 3 and the vibration motor driving unit 1. When a touch input occurs, the vibration motor 5 may be configured to vibrate to inform the user who provided the touch input that the electronic device 10' has successfully detected the touch input.

Even when the AP 3 is in the active mode, a delay may occur from the third time point at which the touch detection unit 2 is ready to report to the AP 3 that a touch input has occurred to the fourth time point at which the AP 3 starts providing the first control signal through the first communication channel 32 to confirm the generation and occurrence position of the touch input and drive the vibration motor 5, and in the present specification, this may be referred to as a second delay.

The first communication channel 32 may be, for example, using an I2C communication protocol, and at this time, through the I2C communication protocol, the AP 3 may transmit information on the vibration intensity and vibration period of the vibration motor to the vibration motor driving unit 1.

Or the first communication channel 32 may be configured to transmit, for example, a PWM signal used in the vibration motor driving unit 1.

The vibration motor driving unit 1 may include a full bridge circuit or a half bridge circuit as a circuit for providing a driving current Icoil to the vibration motor 5. The vibration motor 5 may include a coil, and both terminals of the coil may be connected to two output terminals OUTP and OUTN provided by the bridge circuit, respectively.

The on-off control of the gate of the FET included in the bridge circuit may be performed using the PWM signal to provide the driving current Icoil. At this time, the supply amount of the driving current Icoil may be adjusted according to the inter-pulse interval and duty ratio of the PWM signal.

On the other hand, the voltages of the two output terminals OUTP and OUTN may vary according to the input voltage VDD provided to the bridge circuit.

Also, the resistance RFET and ON between the source and the drain of the FET may be varied by a specific value of the turn-on voltage, which is a voltage provided to the gate of the FET, and as a result, the respective voltages of the two output terminals OUTP and OUTN may be changed by the turn-on voltage.

Therefore, as the voltage provided to the input voltage VDD may be variably provided using the DC-DC converter, and/or the turn-on voltage may be variably provided using the DAC, the voltage of the two output terminals OUTP and OUTN may be controlled.

If the DAC is used, the output of the DAC may be connected to the gate of the FET. When a minimum voltage for turning on the FET is Vftom, in a time section in which the logic value of the PWM signal to be inputted to the gate of the FET is '0', the DAC may be provided with a first digital input value to cause the DAC to output a value less than Vftom.

And, in the time section in which the logic value of the PWM signal is '1', the DAC may be provided with a second digital input value to cause the DAC to output a value equal to or greater than Vftom. The value of the resistors RFET and ON may be controlled by controlling the second digital input value.

In one embodiment, the output of the DAC may be provided to the gate of the FET through an amplifier.

In the case where the electronic device 10' is portable and operated by a battery, when driving by the vibration motor driving unit 1 is not required, the power supplied to the vibration motor driving unit 1 may be cut off. After that, if the driving by the vibration motor driving unit 1 is to be resumed, the power must be supplied again. This interruption and supply of power may be performed by the power supply unit 4. The power supply unit 4 may be implemented by a boost IC.

The power supply unit 4 may provide power to the vibration motor driving unit 1 via the power line 41. With the power supply unit 4 interrupting the power supply through the power line 41, if the AP 3 provides a first wake up signal to the power supply unit 4 via the first wake up channel 33, the power supply unit 4 may resume power supply through the power line 41. This process may take a predetermined amount of time. For example, when the AP 3 in the idle mode receives the interrupt signal from the touch detection unit 2, the AP 3 may not only be in an active state by itself but may also provide the power supply unit 4 with the first wake up signal.

Meanwhile, in one embodiment, the power supply unit 4 may receive the fact when the AP 3 is in the idle mode and may block the power supply via the power line 41 when the AP 3 is in the idle mode.

When the electronic device 10' detects the touch input, it may drive a specific user output interface to feed back the fact to the user. However, due to the above-mentioned first delay and/or second delay, even if a touch input is provided from the user, there is a problem that the driving of the user output interface for the feedback may be delayed.

In FIG. 1, a vibrator including a vibration motor is described as an example of the user output interface, but it may be understood that the same problem may occur even if the vibrator is replaced with a speaker or a display module.

The embodiment shown in FIG. 1 is for comparison with an embodiment of the present invention, and not all contents described with reference to FIG. 1 are recognized as prior art.

<First Embodiment>

FIG. 2 is a block diagram illustrating an electronic device 10' according to an embodiment of the present invention in which functions necessary for an output to be provided to a user in response to the touch input are selected. The electronic device 10 may be, for example, a portable terminal such as a tablet or a smart phone.

In one embodiment, the electronic device 10 may include other components, such as a battery, and the other components may interact with the components shown in FIG. 2, but the description of other components is omitted for convenience. Unless contrary to the concept of the present invention, the operating principle of the electronic device 10' shown in FIG. 1 may be applied to the electronic device 10 shown in FIG. 2 as it is.

Hereinafter, description of the same contents of the electronic device 10 shown in FIG. 2 and the electronic device 10' shown in FIG. 1 may be omitted.

The electronic device 10' may include a vibration motor driving unit 1, a touch detection unit 2, an AP 3, a power supply unit 4, a vibration motor 5, a touch panel 6, and an OR logic 7.

The touch detection unit 2 may detect the presence or absence of user input to the touch panel 6 and the occurrence position thereof.

In a state where the AP 3 is in the idle mode, the touch detection unit 2 may provide an interrupt signal to the AP 3 when the occurrence of the touch input is confirmed. If the AP 3 is provided with the interrupt signal in the idle mode, the AP 3 may be switched to the active mode. At this time, the first delay may exist from a first time point at which the touch input occurs to a second time point at which the AP 3 is switched to the active mode.

The AP 3 in the active mode state may be provided with the touch input from the touch detection unit 2 and the touch position. When touch input occurs, the AP 3 may transmit a first control signal for driving the vibration motor 5 to the vibration motor driving unit 1 through the first communication channel 32 provided between the AP 3 and the vibration motor driving unit 1. When a touch input occurs, the vibration motor 5 may be configured to vibrate to inform the user who provided the touch input that the electronic device 10' has successfully detected the touch input.

Even when the AP 3 is in the active mode, a second delay may exist from the third time point at which the touch detection unit 2 is ready to report the touch input occurrence event to the AP 3 to the fourth time point at which the AP 3 starts providing the first control signal through the first communication channel 32 to confirm the occurrence of the touch input and drive the vibration motor 5.

The first communication channel 32 may be, for example, using an I2C communication protocol, and at this time, through the I2C communication protocol, the AP 3 may transmit information on the vibration intensity and vibration period of the vibration motor to the vibration motor driving unit 1. Or the first communication channel 32 may be configured to transmit, for example, a PWM signal used in the vibration motor driving unit 1. However, in the present invention, there is no restriction on the specific communication protocol that the first communication channel follows.

The vibration motor driving unit 1 may include a full bridge circuit or a half bridge circuit as a circuit for providing a driving current Icoil to the vibration motor 5. The vibration motor 5 may include a coil, and both terminals of the coil may be connected to two output terminals OUTP and OUTN provided by the bridge circuit, respectively.

The on-off control of the gate of the FET included in the bridge circuit may be performed using the PWM signal to provide the driving current Icoil. At this time, the supply amount of the driving current Icoil may be adjusted according to the inter-pulse width and duty ratio of the PWM signal.

On the other hand, the voltages of the two output terminals OUTP and OUTN may vary according to the input voltage VDD provided to the bridge circuit. Also, the resistance RFET and ON between the source and the drain of the FET may be varied by a specific value of the turn-on voltage, which is provided to the gate of the FET, and as a result, the voltages of the two output terminals OUTP and OUTN may be changed by the turn-on voltage. Therefore, as the voltage provided to the input voltage VDD may be variably provided using the DC-DC converter, and/or the turn-on voltage may be variably provided using the DAC 125, the voltage of the two output terminals OUTP and OUTN may be controlled.

If the DAC 125 is used, the output of the DAC 124 may be connected to the gate of the FET. When a minimum voltage for turning on the FET is Vftom, in a time section in which the value of the PWM signal is '0', the DAC 125 may be provided with a first digital input value to cause the DAC 125 to output a value less than Vftom, and in a time section in which the value of the PWM signal is '1', the DAC 125 may be provided with a second digital input value to cause the DAC 125 to output a value equal to or greater than Vftom. The value of the resistors RFET and ON may be controlled by controlling the second digital input value.

In the case where the electronic device 10' is portable and operated by a battery, when driving by the vibration motor driving unit 1 is not required, the power supplied to the vibration motor driving unit 1 may be cut off After that, if the driving by the vibration motor driving unit 1 is to be resumed, the power must be supplied again. This interruption and supply of power may be performed by the power supply unit 4.

With the power supply unit 4 interrupting the power supply to the power line 41 supplying power to the vibration motor driving unit 1, if the AP 3 provides the first wake up signal via the first wake up channel 33, the power supply unit 4 may resume power supply to the power line 41. This process may take a predetermined amount of time.

Meanwhile, in one embodiment, the power supply unit 4 may receive the fact when the AP 3 is in the idle mode and may block the power supply via the power line 41 when the AP 3 is in the idle mode.

When the electronic device 10 detects the touch input, it may drive a specific user output interface to feed back the fact to the user. However, due to the above-mentioned first delay and/or second delay, even if a touch input is provided from the user, there is a problem that the driving of the user output interface for the feedback may be delayed.

Therefore, the electronic device 10 according to the embodiment shown in FIG. 2 may include a second communication channel 22 for connecting the touch detection unit 2 and the vibration motor driving unit 1, a second wakeup channel 23 connecting the touch detection unit 2 and the power supply unit 4, and an OR logic 7 for providing to the power supply unit 4 the results computed by the logical OR operation of a first wake up signal provided through the first wake up channel 33 and a second wake up signal provided through the second wake up channel 23.

In one embodiment of the present invention, with the AP 3 in the idle mode, when the occurrence of the touch input is confirmed, the touch detection unit 2 may transmit a second control signal for driving the vibration motor 5 to the vibration motor driving unit 1 via the second communication channel 22.

The second communication channel 22 may be, for example, using an I2C communication protocol, and at this time, through the I2C communication protocol, the AP 2 may transmit information a vibration pattern including the vibration intensity and/or vibration period of the vibration motor to the vibration motor driving unit 1.

Or the second communication channel 22 may be configured to transmit, for example, a PWM signal used in the vibration motor driving unit 1 or a control signal in the form of a pulse train. The shape and generation method of the pulse train will be described later.

Even with the above example, in the present invention, there is no restriction on the specific communication protocol that the second communication channel 22 follows.

For the control of the second communication channel 22 and the second wakeup channel 23, the touch detection unit 2 may include a vibration motor control unit 25.

In one embodiment, a second wake-up signal provided via the second communication channel 22 and the second wake-up channel 23 may be generated and provided from the touch detection unit 2. That is, the second communication channel 22 and the second wakeup channel 23 may be unidirectional communication channels.

The vibration motor control unit 25 may have a first control mode and a second control mode, which are at least two control modes for generating the second control signal.

In the first control mode, the vibration motor control unit 25 may check whether the AP 3 is in the idle state. And the vibration motor control unit 25 may activate the second communication channel 22 only when the AP 3 is in the idle state. That is, the second control signal may be provided from the touch detection unit 2 to the vibration motor driving unit 1 only when the AP 3 is in the idle state. Accordingly, only for the first touch input while the AP 3 is in the idle state, the touch detection unit 2 may directly provide the vibration motor driving unit 1 with the second control signal for vibration control.

In the second control mode, whenever the touch input is generated regardless of whether the AP 3 is in the idle state, the vibration motor controller 25 may control the touch detection unit 2 to directly provide the vibration motor driving unit 1 with the second control signal for vibration control.

The selection of either the first control mode or the second control mode may be made by the manufacturer at the time of designing the electronic device 10. Or, the electronic device 10 may be configured such that the user may select either the first control mode or the second control mode, and for this purpose, the setting of the register for mode selection among the registers included in the touch detection unit 2 may be designed to be changed by the user.

The vibration motor control unit 25 may provide the second wake-up signal via the second wake-up channel 23 when the AP 3 is in the idle state. The second wake-up signal may be provided to the power supply unit 4 via the OR logic 7, and the power supply unit 4 may resume operating power supply to the vibration motor driving unit 1 via the power line 41 in response to the second wake-up signal. As a result, even before the AP 3 is completely switched from the idle mode to the active mode and the AP 3 transmits the first wakeup signal to the power supply unit 4, the operation power may be supplied to the vibration motor driving unit 1 by the second wake-up signal.

In one embodiment, the vibration motor control unit 25 may know whether or not the power supply unit 4 is supplying power through the power line 41, and the second wake-up signal may be generated and delivered only when the power supply is not being performed.

<Processing Duplicated Control Signals of Duplicated Vibration Motor Driving Unit>

In the case where the touch detection unit 2 directly controls the vibration motor driving unit 1 by the second control signal transmitted through the second communication channel 22 in response to the touch input, the AP 3 may be designed not to generate the first control signal for driving the vibration motor driving unit 1 in response to the touch input. In this case, the AP 3 needs to receive, from the touch detection unit 2, information requesting not to generate the first control signal despite the touch input.

Unlike this, in the case where the touch detection unit 2 directly controls the vibration motor driving unit 1 by the second control signal transmitted through the second communication channel 22 in response to the touch input, the AP 3 may be designed to generate the first control signal for driving the vibration motor driving unit 1 in response to the touch input. In this case, for the same touch input event, the vibration motor driving unit 1 may receive the first control signal from the AP 3 and the second control signal from the touch detection unit 2 with a slight time difference. At this time, the first control signal and the second control signal may have the same purpose. When the first instruction according to the first control signal and the second instruction according to the second control signal are performed, two vibration outputs may be generated for one touch input, and this may cause confusion to the user.

Two methods for limiting the duplicated vibration output to a single vibration output may be provided.

First, through the exchange of messages between the AP 3 and the touch detection unit 2, a method for allowing only one of them to control the vibration motor driving unit 1 is possible.

Second, instead of allowing the AP 3 and the touch detection unit 2 to provide the first control signal and the second control signal for controlling the vibration motor driving unit 1, respectively, a method of invalidating the first control signal received late by the vibration motor driving unit 1 and processing it is possible.

In an embodiment of the present invention, the second method may be used. Hereinafter, the second method will be described.

FIG. 3 is a diagram showing the timing of the first control signal provided by the AP 3 and the timing of the second control signals provided by the touch detection unit 2 to control the vibration motor driving unit 1 according to an embodiment of the present invention.

t1, t4, t6, and t8 in FIG. 3(*a*) show the time point at which the touch detection unit 2 generates the second control signal corresponding to the touch input, and t3, t5, t7, and t9 in FIG. 3(*b*) show the time point at which the AP 3 generates the first control signal corresponding to the same touch input. The x-axis in FIG. 3 represents time.

In FIG. 3(*a*), TC-Ex (x=1, 2, 3, 4) is a symbol for distinguishing the second control signals generated for the x-th touch input and in FIG. 3(*b*), AC-Ex (x=1, 2, 3, 4) is a symbol for distinguishing the first control signals generated for the x-th touch input.

The second control signals TC-E1, TC-E2, TC-E3, and TC-E4 correspond to the first control signals AC-E1, AC-E2, AC-E3, and AC-E4, respectively.

The time point t2 indicates the time point at which the AP 3 in the idle mode starts to switch to the active mode after receiving the interrupt signal from the touch detection unit 2.

The time points t1, t4, t6, and t8 at which the second control signals are generated are a time point slightly behind the time point at which the user's actual touch input to the touch panel is made.

The time points t3, t5, t7 and t9 at which the first control signals are generated are the time points at which predetermined delays D1, D2, D3, and D4 are added to the time points at which the corresponding second control signals are generated.

There are predetermined delays D1, D2, D3, and D4 between the time when the touch detection unit 2 detects the touch inputs and outputs the corresponding second control signals TC-E1, TC-E2, TC-E3, and TC-E4, and the time when the AP 3 confirms each of the touch inputs from the touch detection unit 2 and outputs first control signals AC-E1, AC-E2, AC-E3, and AC-E4 corresponding to the touch input. This delay may be due to software running on the AP 3.

Especially, from the time when the touch detection unit 2 detects the first touch input that causes the second control signal TC-E1 to the time when the AP 3 in the idle mode confirms the first touch input from the touch detection unit 2 and outputs the second control signal TC-E1 corresponding to the first touch input, the delay time required for the AP 3 to switch from the idle mode to the active mode may be further included. Therefore, the delay D1 may have a larger value than the delays D2, D3, and D3.

Referring to FIG. 3, for example, for the first touch input of the user, the vibration motor driving unit 1 receives the second control signal TC-E1 at the time point t1 and drives the vibration motor and receives the first control signal AC-E1 at the time point t2 and drives the vibration motor. At this time, since the second control signal TC-E1 and the first control signal AC-E1 are for one of the first touch inputs, the vibration motor may react twice to a single touch input, and this may be a problem.

In order to solve such a problem, the vibration motor driving unit 1 may include a control signal selection unit 11. The control signal selection unit 11 may receive the first control signal via the first communication channel 32 after receiving the second control signal via the second communication channel 22. Next, if it is determined that the delay between the first control signal and the second control signal is equal to or less than a predetermined first delay, the control signal selection unit 11 may determine that the first control signal and the second control signal are generated in duplicate for the same touch input event. If it is determined that the first control signal and the second control signal are generated in duplicate, the control signal selection unit 11 may invalidate the first control signal that is reached later. That is, the control signal selection unit 11 may process the vibration motor so as not to vibrate by the first control signal.

In one embodiment of the present invention, after the second control signal is received, if a first control signal corresponding to the second control signal is not provided from the AP 3 within the first delay, the control signal selection unit 11 may output a predetermined second pattern of vibration through a vibration motor or may output a predetermined signal through another user output interface (e.g., a screen or a sound). By doing so, it is possible to feedback to the user that the touch input of the user is well detected, but the response of the AP 3 according thereto is not performed quickly.

In one embodiment of the present invention, if it is determined that the second control signal is not received from the touch detection unit 2 before a predetermined time from when the first control signal is received from the AP 3, the control signal selection unit 11 may determine that the first control signal is provided not for the touch input but for another reason. For example, to notify users of specific events regardless of touch input, the AP 3 may independently provide the first control signal to the vibration motor driving unit 1. In this case, the control signal selection unit 11 effectively processes the first control signal from the AP 3, and processes the vibration motor to vibrate by the first control signal.

<Generation of Vibration Pattern>

In the embodiment of the present invention described with reference to FIGS. 2 and 3, the vibration feedback delay according to the touch input is minimized, thereby improving the quality of the user experience corresponding to the touch input.

To improve the user experience quality, in another embodiment of the present invention, the vibration pattern may be automatically generated based on at least one of the position of the touch input to the touch panel, the intensity of the input, the input direction, and the touch contact duration for input.

The vibration pattern may mean that the vibration period and the vibration intensity of the vibration motor are defined according to time. For example, the first vibration pattern generated when touch input is made to the first point of the touch panel may be different from the second vibration pattern generated when the touch input is performed to the second point of the touch panel.

In one embodiment, the touch detection unit 2 shown in FIG. 2 may store at least one of the position of the touch input, the intensity of the input, the input direction, and the touch contact duration for input as parameters. The parameters may be provided to the vibration motor driving unit 1 via the second communication channel 22. The vibration motor driving unit 1 may generate and apply the vibration pattern based on the parameters.

In another embodiment, the vibration motor control unit 25 may generate the vibration pattern of the vibration motor by substituting the one or more parameters into a previously provided equation or table. And, information on the vibration pattern may be provided to the vibration motor driving unit 1 via the second communication channel 22. The vibration motor driving unit 1 may drive the vibration motor 5 according to the vibration pattern.

The second communication channel 22 may be used to transmit necessary information using the I2C protocol or may be used to pass a PWM signal or a pulse train.

In the embodiment for transmitting the PWM signal or the pulse train through the second communication channel 22, the vibration motor control unit 25 may generate the PWM signal or the pulse train corresponding to the generated vibration pattern and transmit them through the second communication channel 22. In this case, the vibration motor driving unit 1 may generate a vibration motor driving current Icoil according to the PWM signal or the pulse train.

Unlike this, if the second communication channel 22 complies with the I2C protocol, the vibration motor control unit 25 may provide the vibration motor driving unit 1 with the parameters for the setting values relating to the vibration period and the vibration intensity corresponding to the generated vibration pattern through the second communication channel 22. In this case, the vibration motor driving unit 1 may generate a PWM signal or a pulse train by using the parameters provided through the second communication channel 22, and may generate a vibration motor driving current Icoil using the PWM signal or the pulse train. At this time, the parameter may include a voltage control value for controlling a potential difference between a pair of output terminals OUTP and OUTN of the vibration motor driving unit 1 to which the vibration motor driving current Icoil is inputted/outputted. When the voltage control value is included in the parameter, the vibration motor driving unit 1 may control the potential difference between the pair of output terminals OUTP and OUTN by reflecting the voltage control value.

A specific embodiment for controlling the vibration motor driving current Icoil in the vibration motor driving unit 1 may be implemented as follows.

<Control of Vibration Motor Driving Current Icoil>

In one embodiment of the present invention, the vibration motor driving unit 1 may be implemented as shown in FIG. 4.

FIG. 4 shows a configuration of a vibration motor driving unit according to an embodiment of the present invention.

The vibration motor driving unit 1 may include a driving current output unit 15 for outputting a vibration motor driving current Icoil for driving a vibration motor. The driving current output unit 15 may include a bridge circuit including, for example, four FETs M1, M2, M3 and M4. The bridge circuit may include a bridge circuit control unit 12 for controlling the gate voltage of each FET. In addition, the vibration motor driving unit 1 may include the control signal selection unit 11 described above.

The control signal selection unit 11 may select either the first control signal received via the first communication channel 32 and the second control signal received via the second communication channel 22 and may provide a PWM signal or pulse train to be provided to the bridge circuit control unit 12 via the terminals AIN and BIN. The gate of the FET may be provided with an analog signal based on the PWM signal or the pulse train, respectively.

The vibration motor driving current Icoil flowing through the pair of output terminals OUTP and OUTN provided in the vibration motor driving unit 1 may be controlled by the operation of the bridge circuit. As on/off of the gates of the FETs included in the bridge circuit is controlled according to the provided PWM signal or pulse train, the direction, size, and duration of the vibration motor driving current Icoil may be controlled. As shown in FIG. 4, the vibration motor 5 may include a coil L1, and the vibration motor driving current Icoil may flow through the coil L1.

And, the first power supplied to the vibration motor driving unit 1 through the power line 41 may be provided as the driving voltage VM of the bridge circuit. At this time, the driving voltage VM may be the first power itself or a power obtained by boosting or depressurizing the first power via the DC-DC converter 13. The DC-DC converter 13 may be included in the vibration motor driving unit 1 or may be provided outside the vibration motor driving unit 1.

In one embodiment, when the parameters for the vibration period, the vibration intensity, and the voltage control value corresponding to the generated vibration pattern are provided through the second communication channel 22, the control signal selection unit 11 may control the value of the driving voltage VM by controlling the operation of the DC-DC converter 13 based on the voltage control value.

FIG. 5 shows a part of the configuration of the vibration motor driving unit 1 modified from FIG. 4.

The direction and duration of the vibration motor driving current Icoil may be determined by the duty and period of the PWM signal, or may be determined by the shape of the pulse train, and the magnitude of the vibration motor driving current Icoil may be controlled as follows.

That is, by comparing the voltage at the both ends of the detection resistor REXT disposed in the path of the vibration motor driving current Icoil with the reference potential VREF using the comparator 410, it is possible to generate a value C1 indicating whether the vibration motor driving current Icoil exceeds a predetermined value. If the vibration motor driving current Icoil exceeds a predetermined value, the FETs M1, M2, M3, and M4 that are performing on/off operations according to the PWM signal or the pulse train are temporarily turned off and by inducing the natural reduction of the vibration motor driving current Icoil, it is possible to control the vibration motor driving current Icoil to fall below a predetermined value. At this time, if the vibration motor driving current Icoil falls below a predetermined value, the on/off state of the FETs M1, M2, M3, and M4 may be restored to follow the control of the PWM signal or the pulse train. By doing so, the magnitude of the vibration motor driving current Icoil may be controlled.

In addition, the voltage between the pair of output terminals OUTP and OUTN may be controlled by the driving voltage VM, but may be controlled using the DAC 125 shown in FIG. 5 as follows.

That is, in FIG. 4, when the bridge circuit control unit 12 controls the gate voltages of the FETs M1, M2, M3 and M4 by the PWM signal or the pulse train, the gate voltage for keeping the FET in the on state may be fixed to a predetermined value. But, in the embodiment shown in FIG. 5, the gate voltage for keeping the FET in the on state is not fixed to a specific value, and may be variable according to the voltage control value provided to control the potential difference between the pair of output terminals OUTP and OUTN. The variable may be performed using the DAC 125 shown in FIG. 5. When the FET is on, RFET and ON, that is, the resistance between the drain and the source of the FET, may be varied by the gate voltage.

Although FIG. 5 shows an example in which the DAC outputs the gate voltages of all the FETs, even if only the gate voltage of some of the FETs is outputted through the DAC, the potential difference between the pair of output terminals OUTP and OUTN may be controlled.

As described above, by controlling a potential difference between the pair of output terminals OUTP and OUTN, controlling the magnitude of the vibration motor driving current Icoil, and controlling the duration of the vibration motor driving current Icoil according to the PWM signal, the power change provided to the coil may be controlled.

Further, since the PWM signal or the pulse train follows the parameters or the vibration pattern generated by the touch detection unit 2, when the user provides the touch input using all the processes described above, it is possible to transmit optimum vibration feedback. Then, such a vibration feedback may be generated immediately using the technique described with reference to FIGS. 2 and 3.

<User Interface Device Driving Chip Integrating Touch Detection Unit and Vibration Motor Driving Unit>

FIG. 6 is for describing a user interface device driving chip 100 provided according to an embodiment of the present invention.

The user interface device driving chip 100 incorporates the functions of the touch detection unit 2 and the vibration motor driving unit 1 described above.

The user interface device driving chip 100 includes a touch detection module 102, a vibration motor driving module 101, a touch panel interface terminal 151, an interrupt signal output terminal 152, a second wakeup signal output terminal 153, a first control signal input terminal 154, a power supply unit power input terminal 155, and a vibration motor driving current output terminal 156 (OUTP, OUTN). In addition, there may be other input/output terminals not shown in FIG. 6.

The touch detection module 102 may have the same structure as the touch detection unit 2 described above.

The vibration motor driving module 101 may have the same structure as the vibration motor driving unit 1 described above. That is, it may have the structure shown in FIG. 4.

The touch panel interface terminal 151 is a terminal for connection with the touch panel 6 for exchanging signals with the touch detection module 102.

The interrupt terminal 152 is a terminal for forming an interrupt signal transfer channel 121 between the user interface device driving chip 100 and the AP 3.

The second wake-up signal output terminal 153 is a terminal for outputting the second wake-up signal for forming a second wake-up channel 123 to transmit a second wake-up signal that causes the external power supply unit 4, which provides power to some components of the user interface device driving chip 100, e.g., the vibration motor driving module 101, to switch from the idle mode to the active mode.

The first control signal input terminal 154 is a terminal for receiving the first control signal for controlling the vibration motor 5 driven by the user interface device driving chip 100 as a first control signal provided by the AP 3.

The power supply unit power input terminal 155 is a terminal for receiving power supplied from the power supply unit 4. The user interface device driving chip 100 may be supplied with power other than the power supplied from the power supply unit 4.

The vibration motor driving current output terminal 156 may be a pair of terminals OUTP and OUTN through which the vibration motor driving current Icoil generated by the vibration motor driving module 101 is inputted and outputted.

The touch detection module 102 may be configured to provide the vibration motor driving module 101 with the second control signal including information for controlling the vibration motor driving module 101 after detecting a touch input to the touch panel 6 connected to the user interface device driving chip 100 in response to the detected touch input. For this, a second communication channel 122 for transmitting the second control signal may be provided between the touch detection module 102 and the vibration motor driving module 101.

The vibration motor driving module 101 may be configured to output a vibration motor driving current Icoil for driving the vibration motor 5 through the output terminal 156 of the user interface device driving chip according to the second control signal.

And, the first power provided to at least some of the elements constituting the vibration motor driving module 101 may be separated from the power provided to the touch detection module 102, and the first power may be provided from a power supply unit 4 provided to the outside of the user interface device driving chip 100. At this time, some of the elements may include, for example, elements included in the bridge circuit described above.

The touch detection module 102 is configured to provide the second wakeup signal to the power supply unit 4 via a second wakeup channel 123 in response to the touch input. The second wake-up signal is a signal to switch the power supply unit 4 to the active mode so that the power supply unit 4 supplies power to the at least some of the elements in the vibration motor driving module 101 when the power supply unit 4 is in the idle mode.

A technique for generating the above-described pulse train will be described below. The pulse train may be used in the vibration motor driving unit 1 shown in FIG. 2 or the vibration motor driving module 101 shown in FIG. 6. In the embodiment according to FIG. 2 and the embodiment according to FIG. 6, since the principle of generating the pulse train is the same, the following description will be made on the basis of the embodiment according to FIG. 6, and it may be easily understood that this content may be applied to the embodiment according to FIG. 2.

FIG. 7 is a diagram for explaining a technique for generating the above-described pulse train used in the vibration motor driving module, according to an embodiment of the present invention.

In one embodiment of the present invention, a pulse train 510 applied to the gates of the FETs M1 to M4 included in the vibration motor driving module 101 shown in FIG. 6 may be generated by the vibration motor control unit 25 shown in FIG. 6. At this time, the generated pulse train may be transmitted to the vibration motor driving module 101 via the second communication channel 122. The shapes of the pulse trains 510 applied to the gates of the respective FETs M1 to M4 may be different from each other.

The vibration motor control unit 25 may include a vibration pattern control unit 226 and a state machine 225.

The vibration pattern control unit 226 may store vibration pattern parameters PSTATE, PDUTY, PINT, PPULSE_HEIGHT, and PVM for generating the pulse train 510. The vibration pattern parameters may be selected as different values depending on the type of the touch event.

The vibration pattern parameter PVM is provided as a control signal of the DC-DC converter 13 and may be used to control the value of the bridge circuit drive voltage VM outputted from the DC-DC converter 13.

Vibration pattern parameters PSTATE, PDUTY, PINT, and PPULSE_HEIGHT may be provided to the state machine 225.

The state machine 225 may generate the form of a pulse train 510 provided to the vibration motor driving module 101 according to the vibration pattern parameters PSTATE, PDUTY, PINT, and PPULSE_HEIGHT. The operation method of the state machine 225 and the form of the pulse train 510 will be described later.

The pulse train 510 may have a digital value and may be changed to an analog form by the DAC 125 and provided to the gate of the FET. The output signal of the DAC 125 may pass through an amplifier (not shown) before being applied to the gate of the FET.

FIG. 8 is a diagram for explaining a technique for generating the above-described pulse train used in the vibration motor driving module, according to another embodiment of the present invention.

In one embodiment of the present invention, a pulse train 510 applied to the gates of the FETs M1 to M4 included in the vibration motor driving module 101 shown in FIG. 6 may be generated by the vibration motor driving module 101. For this, the touch detection module 102 may deliver a command to generate the pulse train 510 and the base data necessary therefor via the second communication channel 122.

The vibration motor driving module 101 may include the same vibration pattern control unit 226 and state machine 225 as described with reference to FIG. 7.

FIG. 9 is a diagram for explaining a technique for generating the above-described pulse train used in the vibration motor driving module, according to another embodiment of the present invention.

The vibration motor driving module 101 may include the same state machine 225 as described in FIG. 7 and the vibration motor control unit 25 may include a vibration pattern control unit 226.

The vibration pattern control unit 226 may generate and provide vibration pattern parameters PSTATE, PDUTY, PINT, and PPULSE_HEIGHT to the state machine 225 via the second communication channel 122.

The DC-DC converter 13 shown in FIGS. 7 to 9 may be inside or outside the vibration motor driving module 101. Or, the DC-DC converter 13 shown in FIGS. 7 to 9 may be omitted. That is, the driving voltage VM provided to the bridge circuit may be fixed to a constant value, or may be variable depending on the output voltage of the battery.

In FIGS. 7 to 9, other components including the AP 3, the OR logic 7, the power supply unit 4, and the vibration motor 5 described with reference to FIG. 6 are omitted for convenience of explanation.

FIG. 10 shows an example of the pulse train 510 described with reference to FIGS. 7 to 9.

In FIG. 10, the horizontal axis represents the time axis, and the vertical axis represents the size of the pulse train 510.

When the pulse train 510 is divided into partial pulse trains of successive pulses, each partial pulse train may be divided into one of the following three types. That is, in relation to the first type partial pulse train 511, the interval between the pulses P11 to P15 included in the partial pulse train 511 may increase with time. Then, in relation to the second type partial pulse train 512, the interval between the pulses P21 to P25 included in the partial pulse train 512 may be constant with time. Then, in relation to the third type partial pulse train 513, the interval between the pulses P31 to P35 included in the partial pulse train 513 may decrease with time.

Each pulse train 510 may include at least one of a first type partial pulse train 511, a second type partial pulse train 512, and a third type partial pulse train 513 at least once. And, the order relationship between the partial pulse trains 511, 512 and 513 in the pulse train 510 may be variously adjusted.

Figure 11B:
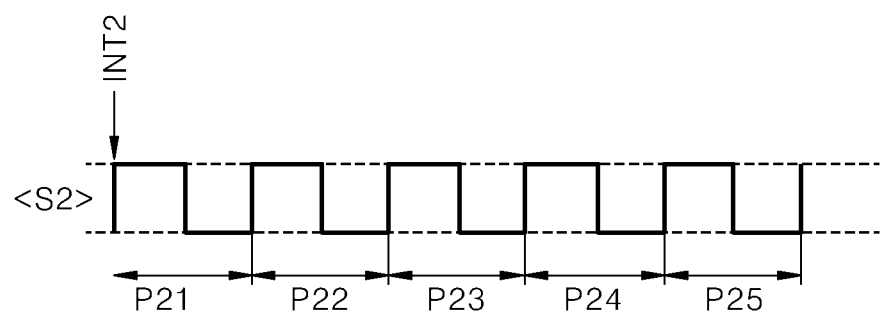
FIG. 11B shows the second type partial pulse train shown in FIG. 10 separately.
Figure 11C:
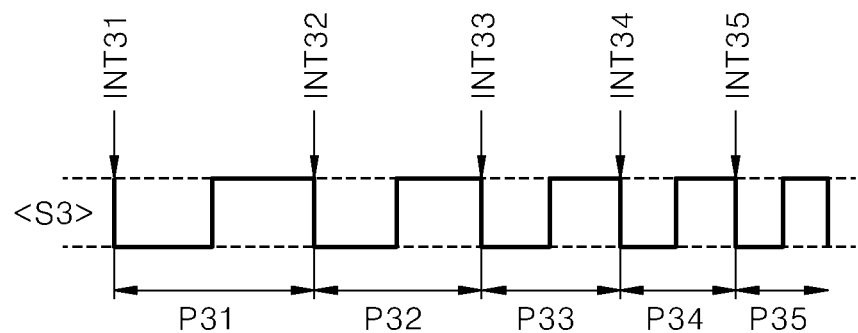
FIG. 11C shows the third type partial pulse train shown in FIG. 10 separately.

FIG. 11A shows the first type partial pulse train 511 shown in FIG. 10 separately. FIG. 11B shows the second type partial pulse train 512 shown in FIG. 10 separately. FIG. 11C shows the third type partial pulse train 513 shown in FIG. 10 separately.

Hereinafter, this will be described with reference to FIG. 10, FIG. 11A, FIG. 11B, and FIG. 11C.

The rising edge or falling edge of each pulse P11 to P15, P21 to P25 and P31 to P35 may be synchronized with a series of interrupt signals PINT received from the vibration pattern control unit 226. It may be understood that the time interval between adjacent interrupts of the series of interrupt signals PINT does not remain constant as it increases or decreases with time. In FIG. 10, the series of interrupt signals PINT are shown as INT11 to INT15, INT2, and INT31 to INT35.

Each pulse included in the first type partial pulse train 511 and the third type partial pulse train 513 may be generated corresponding to each of the interrupt signals PINT. However, each pulse included in the second type partial pulse train 512 may be generated corresponding to only one received interrupt signal PINT.

The duty, which is a ratio between the high level holding time and the low level holding time of each of the pulses P11 to P15, P21 to P25, and P31 to P35, may be controlled differently for each pulse. The duty of each pulse may be controlled by a duty parameter PDUTY. In one embodiment, the duty parameter PDUTY may be updated each time the interrupt signal PINT is generated or sparsely updated.

Specific values of the high level value of each of the pulses P11 to P15, P21 to P25, and P31 to P35 may be independently controlled based on each pulse. That is, each pulse does not have only discrete values of '0' and '1', and the high level value of each pulse may have various digital values. The high level value of each pulse may be controlled by the pulse height parameter PPULSE_HEIGHT. In one embodiment, the pulse height parameter PPULSE_HEIGHT may be updated each time the interrupt signal PINT is generated or sparsely updated.

The state machine 225 may have at least three states. The state transition between states may be made by a state parameter PSTATE received by the state machine 225. That is, for example, when the state parameter PSTATE is updated to the value of the first state S1, the state machine 225 may be switched to the first state S1 of the at least three states.

The first state S1 of the three states is a state in which the width between adjacent output pulses P11 to P15 increases with time, and at this time, the generation interval of the interrupt signal PINT (INT11 to INT15) for the first state S1 increases with time. In one embodiment, the duty and high level value of each of the output pulses P11 to P15 may be controlled by a duty parameter PDUTY and a pulse height parameter PPULSE_HEIGHT given when each of the interrupt signals PINT (INT11 to INT15) is generated.

The second state S2 of the three states is a state in which a width between adjacent output pulses P21 to P25 is kept constant with time, and at this time, the interrupt signal INT for the second state S2 may be generated only once at the beginning or may not be generated at all. In one embodiment, the duty and high level value of each of the output pulses P21 to P25 may be controlled by a duty parameter PDUTY and a pulse height parameter PPULSE_HEIGHT given when the interrupt signals PINT or INT2 is generated. Or, the duty and high level value of each of the output pulses P21 to P25 may be controlled by the duty parameter PDUTY and the pulse height parameter PPULSE_HEIGHT given when the state parameter PSTATE is switched to the value of the second state S2.

The third state S3 of the three states is a state in which the width between adjacent output pulses P31 to P35 decreases with time, and at this time, the generation interval of the interrupt signal PINT (INT31 to INT35) for the third state S3 decreases with time. In one embodiment, the duty and high level value of each of the output pulses P31 to P35 may be controlled by a duty parameter PDUTY and a pulse height parameter PPULSE_HEIGHT given when each of the interrupt signals PINT (INT31 to INT35) is generated.

Conventionally, the PWM signal is supplied to the gate of the bridge circuit included in the vibration motor driving module 101 and drives it, but the pulse train according to one embodiment of the present invention described with reference to FIGS. 7 to 11 may be used in place of the conventional PWM signal.

Each pulse of the pulse train according to an embodiment of the present invention described with reference to FIGS. 7 to 11 is generated every time an interrupt signal PINT, and the interval between the adjacent interrupt signals PINT varies with time and may be kept constant. Even when it is necessary to maintain the intervals between adjacent pulses within the pulse train to be constant, by applying the operation method of the second state S2 and causing the interrupt signal PINT to be generated once or zero, the intervals between the interrupt signals PINT may be kept constant.

FIG. 12 is a modified embodiment of FIG. 2. The vibration motor 5 is generalized to a user output interface device 1005 (ex: vibration motor, speaker, and screen) and the vibration motor driving unit 1 is generalized to a user output interface device driving chip 1001. It may be easily understood that there is no contradiction in the above generalization.

FIG. 13 is a modified embodiment of FIG. 6. The vibration motor 5 is generalized to a user output interface device 1005 (ex: vibration motor, speaker, and screen) and the vibration motor driving module 101 is generalized to a user output interface device driving module 1101. It may be easily understood that there is no contradiction in the above generalization.

According to the present invention, it is possible to provide a technique for minimizing the delay of the response output to be outputted in response to a touch input.

It will be apparent to those skilled in the art that various modifications and variations may be made in the present invention without departing from the spirit or essential characteristics thereof. The contents of each claim may be combined with other claims without departing from the scope of the claims.

What is claimed is:

1. A vibration motor driving device that controls a vibration motor, the vibration motor driving device comprising:
   a control signal selection unit configured to receive a second control signal provided from a touch detection unit for detecting a touch input to a touch panel and including information for controlling the vibration motor;
   wherein the control signal selection unit is further configured to receive a first control signal including information for controlling the vibration motor from an AP performing one or more applications using information on a touch input provided from the touch detection unit;
   wherein when a delay between the second control signal, which is most recently received before receiving the first control signal, and the first control signal is determined to be equal to or less than a predetermined value and the first control signal and the second control signal are all for instructing the driving of the vibration motor to the touch input, the control signal selection unit is configured to discard the first control signal; and
   a driving current output unit configured to output a vibration motor driving current for driving the vibration motor according to the second control signal.

2. An electronic device comprising a touch detection unit, a vibration motor driving unit, and an AP for performing one or more applications using information on a touch input provided from the touch detection unit,
   wherein the touch detection unit detects a touch input to a touch panel connected to the touch detection unit, generates a second control signal including information for controlling the vibration motor driving unit in correspondence to the detected touch input, and provides the generated second control signal to the vibration motor driving unit, wherein the vibration motor driving unit is configured to ① output a vibration motor driving current for driving a vibration motor according to the second control signal, and ② receive a first control signal including information for controlling the vibration motor driving unit from the AP, and ③ discard the first control signal when a delay between the second control signal, which is most recently received before receiving the first control signal, and the first control signal is determined to be equal to or less than a predetermined value and the first control signal and the second control signal are all for instructing the driving of the vibration motor to the touch input.

3. The electronic device of claim 2, further comprising a power supply unit for providing power to the vibration motor driving unit, wherein the touch detection unit is configured to provide a second wake-up signal to the power supply unit in response to the touch input, wherein the power supply unit is configured to switch to an active mode to supply power to the vibration motor driving unit when receiving the second wakeup signal while the power supply unit is in an idle mode.

4. A user output interface device driving chip for controlling a user output interface device that stimulates a person's view point, a hearing sense, and a tactile sense, the user output interface device driving chip comprising a control signal selection unit configured to discard the first control signal when ① receiving a second control signal including information for controlling the user output interface device from a touch detection unit for detecting a touch input to the touch panel, ② receiving a first control signal including information for controlling the user output interface device from an AP that performs one or more applications using information on the touch input provided from the touch detection unit, and ③ a delay between the second control signal, which is most recently received before receiving the first control signal, and the first control signal is determined to be equal to or less than a predetermined value and the first control signal and the second control signal are all for instructing the driving of the vibration motor to the touch input, wherein the user output interface device driving chip is configured to control the user output interface device according to the second control signal.

\* \* \* \* \*